United States Patent
Low et al.

(10) Patent No.: US 6,611,223 B2
(45) Date of Patent: Aug. 26, 2003

(54) METHOD AND APPARATUS FOR ULTRA WIDE-BAND COMMUNICATION SYSTEM USING MULTIPLE DETECTORS

(75) Inventors: Kay Soon Low, Singapore (SG); Kin Mun Lye, Singapore (SG); Paul Kar Ming Ho, Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 09/970,385

(22) Filed: Oct. 2, 2001

(65) Prior Publication Data

US 2003/0063025 A1 Apr. 3, 2003

(51) Int. Cl.$^7$ ............................................. H03M 1/60
(52) U.S. Cl. ................................. 341/157; 315/239
(58) Field of Search ................. 341/157, 112, 341/111, 13; 342/15; 375/239, 295, 316

(56) References Cited

U.S. PATENT DOCUMENTS

| | | | |
|---|---|---|---|
| 3,209,282 A | 9/1965 | Schnitzler | 331/107 |
| 3,239,832 A | 3/1966 | Renard | 340/347 |
| 3,246,256 A | 4/1966 | Sommers, Jr. | 331/107 |
| 3,303,350 A | 2/1967 | Neff et al. | 307/88.5 |
| 3,312,911 A | 4/1967 | De Boer | 340/347 |
| 3,387,298 A | 6/1968 | Kruy | 340/347 |
| 3,527,949 A | 9/1970 | Huth | 250/199 |
| 3,571,753 A | 3/1971 | Saunders | 331/111 |
| 3,755,696 A | 8/1973 | Nicholson et al. | 302/296 |
| 3,761,826 A | 9/1973 | Vollmeyer et al. | 302/296 |
| 3,846,717 A | 11/1974 | Fleming | 332/152 |
| 3,967,210 A | 6/1976 | Aumann | 178/50 |
| 4,028,562 A | 6/1977 | Zuleeg | 327/566 |
| 4,037,252 A | 7/1977 | Janssen | 358/128 |
| 4,365,212 A | 12/1982 | Gentile et al. | 331/111 |
| 4,425,647 A | 1/1984 | Collins et al. | 371/70 |
| 4,459,591 A | 7/1984 | Haubner et al. | 340/825.57 |
| 4,560,949 A | 12/1985 | Young | 330/284 |
| 4,599,549 A | 7/1986 | Mutoh et al. | 318/798 |
| 4,641,317 A | 2/1987 | Fullerton | 375/1 |

(List continued on next page.)

FOREIGN PATENT DOCUMENTS

| | | | |
|---|---|---|---|
| DD | 94 855 | 1/1973 | G01R/19/26 |
| DE | 2459531 A1 | 7/1976 | H03K/3/28 |
| DE | 2602794 A1 | 7/1977 | H03B/5/06 |
| DE | 19809334 A1 | 9/1999 | |
| FR | 1 438 262 | 7/1966 | H03K/5/00 |
| GB | 1036328 | 7/1966 | |
| JP | 11074766 | 3/1999 | H03K/5/00 |
| WO | WO 00/5597 A2 | 2/2000 | |

OTHER PUBLICATIONS

Abell, E., "Gated Oscillator Emulates a Flip–Flop", EDN Acces, pp. 1–2, Mar. 16, 1995.

Gallerani, A., "Oscillator Meets Three Requirements", EDN Access, pp. 119–120, Dec. 3, 1998.

L. Goras et al., "On Linear Inductance–and Capacitance–Time Conversions Using NIC–Type Configuration," IEEE Transactions on Industrial Electronics, vol. 40, No. 5 pp. 529–531 (Oct. 1993).

(List continued on next page.)

Primary Examiner—Peguy JeanPierre
(74) Attorney, Agent, or Firm—Townsend and Townsend and Crew LLP

(57) ABSTRACT

A method and apparatus for detecting ultra wide-band (UWB) signals using multiple detectors having dynamic transfer characteristics. A receiver circuit is implemented using devices such as op-amps to provide the required dynamic characteristics. Detectors used in the UWB communication systems of the present invention utilize direct sequence spread spectrum (DSSS) technology for multiple access reception.

43 Claims, 7 Drawing Sheets

U.S. PATENT DOCUMENTS

| | | | |
|---|---|---|---|
| 4,743,906 A | 5/1988 | Fullerton | 342/27 |
| 4,862,160 A | 8/1989 | Ekchian et al. | 340/825.54 |
| 5,012,244 A | 4/1991 | Wellard et al. | 341/143 |
| 5,107,264 A | 4/1992 | Novof | 341/101 |
| 5,170,274 A | 12/1992 | Kuwata et al. | 359/182 |
| 5,274,375 A | 12/1993 | Thompson | 341/143 |
| 5,337,054 A | 8/1994 | Ross et al. | 342/93 |
| 5,339,053 A | 8/1994 | Lux et al. | 331/99 |
| 5,459,749 A | * 10/1995 | Park | 327/141 |
| 5,532,641 A | 7/1996 | Balasubramanian et al. | 341/43 |
| 5,610,907 A | 3/1997 | Barrett | 370/342 |
| 5,691,723 A | * 11/1997 | King et al. | 341/173 |
| 5,757,301 A | 5/1998 | Kuo et al. | 341/143 |
| 5,764,702 A | 6/1998 | Caiaffa | 375/316 |
| 5,777,507 A | 7/1998 | Kaminishi et al. | 327/514 |
| 5,789,992 A | 8/1998 | Moon | 332/101 |
| 5,812,081 A | 9/1998 | Fullerton | 329/311 |
| 5,832,035 A | 11/1998 | Fullerton | 342/21 |
| 5,892,701 A | 4/1999 | Huang et al. | 375/210 |
| 5,901,172 A | 5/1999 | Fontana et al. | 375/236 |
| 6,023,672 A | 2/2000 | Ozawa | 364/825 |
| 6,044,113 A | 3/2000 | Oltean | 375/238 |
| 6,060,932 A | 5/2000 | Devin | 332/115 |
| 6,087,904 A | 7/2000 | Wen | 704/22 |
| 6,259,390 B1 | 7/2001 | Joe | 341/133 |
| 6,275,544 B1 | 8/2001 | Aiello et al. | 341/133 |
| 6,292,067 B1 | 9/2001 | Sasabata et al. | 332/178 |

OTHER PUBLICATIONS

V.H. Jakubaschk, "das Grosse Elektronikbastelbuch,"Deutscher Militärverlag, Leipzig, pp. 206–209 (1968).

James P. Keener, Analog Circuitry for the van der Pol and FitzHugh –Nagumo Equations, IEEE 1983, pp. 1011–1015.

U. Tietze et al., "Halbleiter–Schaltungstechnik, Fünfte, überarbeitete Auflage," Springer–Verlag, Berlin Heidelberg, New York, pp. 255–258 (1980).

Patarasen, S. et al., Maximum–Likelihood Symbol Synchronization and Detection of OPPM Sequeunces, IEEE Transactions on Communications, New York, US, Jun. 1994, p. 9, vol. 42, No. 6.

Sen et al., Integration of GaAs/A1As Resonant Tunneling Diodes for Digital and Analog Applications with Reduced Circuit Complexity, pp. 13–16, 1987.

D. Wang et al., "Image Segmentation Based on Oscillatory Correlation," Neutral Computation, vol. 9, pp. 805–836 (1997).

Gang Li et al., "Performance of a Ratio–Threshold Diversity Combining Scheme in FFH/FSK Spread Spectrum Systems in Partial Band Noise Interference," Department of Electrical and Computer Engineering, and Communication Research Centre, IEEE 1992, pp. 0672–0676.

Gang Li et al., "Maximum–Likelihood Diversity Combining in Partial–Band Noise Interference Channel" Department of Electrical and Computer Engineering, and Communication Research Centre, IEEE 1993, pp. 507–511.

* cited by examiner

US 6,611,223 B2

METHOD AND APPARATUS FOR ULTRA WIDE-BAND COMMUNICATION SYSTEM USING MULTIPLE DETECTORS

CROSS REFERENCE TO RELATED APPLICATIONS

This application is related to and commonly assigned U.S. patent application Ser. No. 09/847,777 entitled "Method and Apxparatusifor Signal Detection in Ultra Wide-Band Communications," filed on May 1, 2001, which is incorporated herein by reference.

BACKGROUND OF THE INVENTION

Ultra wide-band (UWB) communication systems have received substantial attention in recent years due to their anti-multipath capabilities, simplicity in transceiver design and low cost. UWB transmission uses very short impulses of radio energy whose characteristic spectrum covers a wide range of radio frequencies. Consequently, the resultant UWB signals have high bandwidth and frequency diversity. Such characteristics make them very well suited for various applications such as wireless high-speed data communications and low cost wireless home networks.

In co-owned and commonly assigned U.S. patent application Ser. No. 09/847,777 a method and apparatus for detecting signals in a UWB communication system is disclosed. Signal detection, according to that application, performs well for unipolar transmitted signals. However, if the desired transmitted signal is bipolar or if there are multiple UWB transmitters operating simultaneously, for example as in the case of multiple user access applications, interference may be experienced among users.

SUMMARY OF THE INVENTION

Generally, embodiments of the present invention are directed at methods and apparatuses for transmitting and/or detecting ultra wide-band (UWB) signals.

According to an illustrative aspect of the invention, a UWB communication system comprises one or more transmitters operable to transmit one or more UWB signals and a receiver operable to receive the UWB signals. According to this aspect of the invention the receiver portion of the system comprises a first circuit having a first pulse generator operable to produce a first pulse sequence in response to the UWB signals; a second circuit coupled in parallel with the first circuit, said second circuit having a second pulse generator operable to produce a second pulse sequence in response to the UWB signals; and a pulse processing circuit operable to decode the first and second code sequences and determine information carried in the UWB signals.

According to another illustrative aspect of the invention, a receiver circuit for receiving a UWB signal comprises an antenna operable to receive the UWB signal, a first circuit having a first pulse generator operable to produce a first pulse sequence in response to the UWB signal, a second circuit coupled in parallel with the first circuit, said second circuit having a second pulse generator operable to produce a second pulse sequence in response to the UWB signal; and a pulse processing circuit operable to decode the first and second code sequences and determine information carried in the UWB signal.

According to another illustrative aspect of the invention, a UWB communication system comprises a plurality of transmitters operable to transmit a corresponding plurality of UWB signals, a plurality of detectors, each detector having a pulse generating circuit for generating a unique pulse sequence in response to the UWB signals, and a pulse processing circuit operable to decode the pulse sequences and determine information carried in the UWB signals.

According to yet another illustrative aspect of the invention, a method of producing information contained in a UWB signal comprises receiving the UWB signal, producing a first pulse sequence from the UWB signal, producing a second pulse sequence from the UWB signal, and producing information based on the first and second pulse sequences.

A further understanding of the nature and the advantages of the inventions disclosed herein is described now in reference to the remaining portions of the specification and the attached drawings.

DETAILED DESCRIPTION OF THE INVENTION

In U.S. patent application Ser. No. 09/847,777, a UWB receiver having a detector with an N-type i–v characteristic curve is disclosed. In the present application multiple detectors similar to the detectors disclosed in the Ser. No. 09/847,777 application and a spread spectrum orthogonal modulation scheme are used in the UWB transmission system, so that multiple UWB transmitters may operate in the system simultaneously.

Figure 1A:
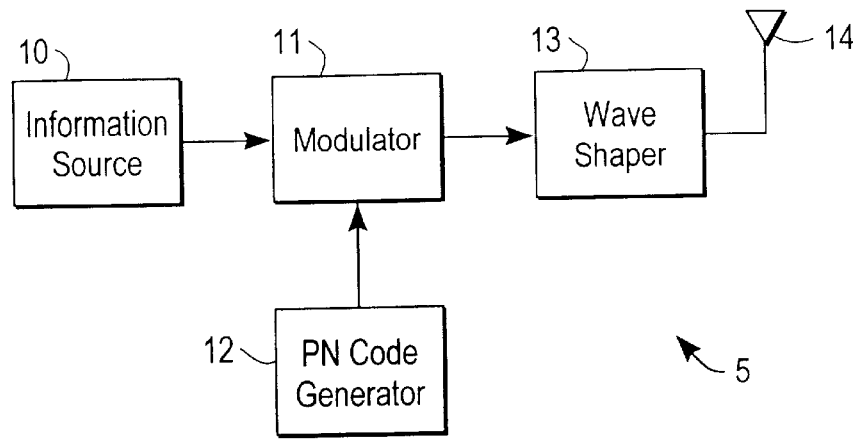
FIG. 1A shows a block diagram of a transmitter for a UWB communication system, according to an embodiment of the present invention.
Figure 1B:
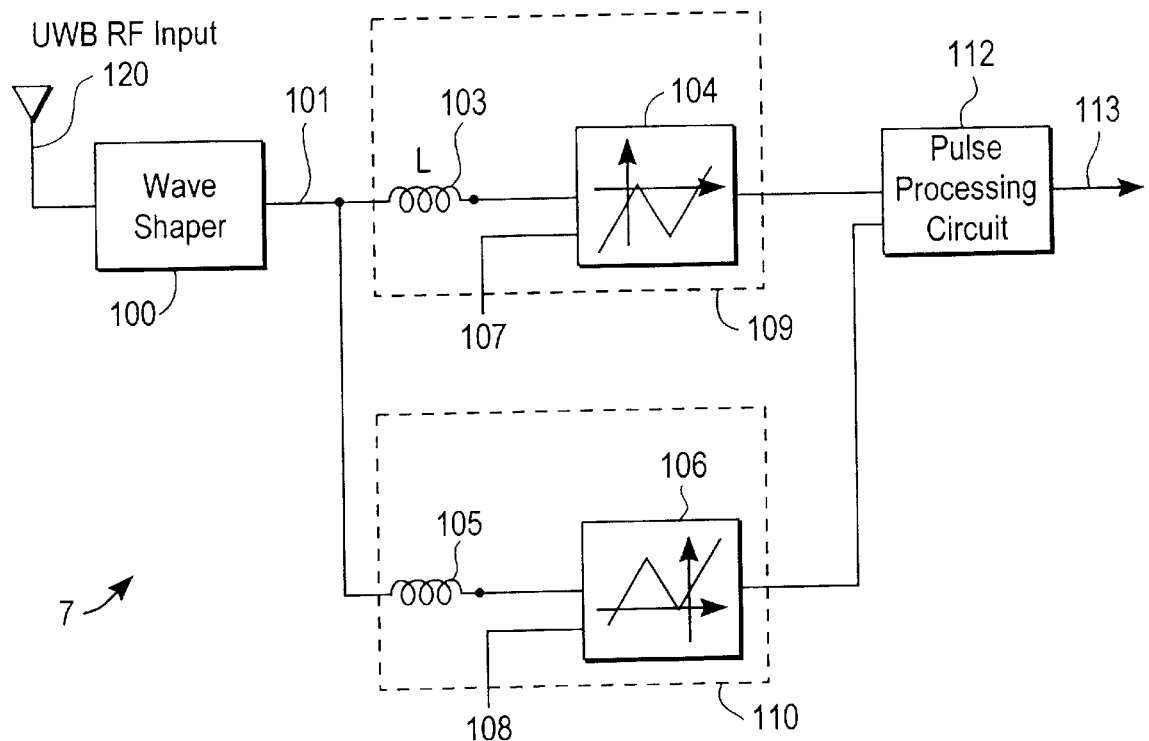
FIG. 1B shows a block diagram of a receiver for a UWB communication system, according to an embodiment of the present invention.

FIG. 1, shows a block diagram of a UWB communication system, according to an embodiment of the present invention. The communication system comprises one or more transmitters 5 and receivers 7, as shown in FIGS. 1A and 1B, respectively. Although only a single transmitter 5 and a single receiver 7 are shown in the figures, embodiments of the present invention also comprise multiple access communication, so that there may be two or more transmitters 5 operating simultaneously over the same channel for reception by two or more receivers 7.

For multiple access communication, interference concerns are overcome by using spread spectrum techniques. A particular spread spectrum technique, which may be used in the embodiments described herein, is the "direct sequence" spread spectrum (DSSS) technique. In a typical DSSS transmitter a pseudorandom or pseudonoise (PN) code sequence generator is used to interface the modulator at the transmitter to spread the transmitted signal. A PN code sequence comprises a code sequence of 1's and 0's whose correlation properties are similar to that of white noise. A PN code generator 12 is shown as comprising part of the transmitter 5 shown in FIG. 1A. PN code generator 12 provides a pseudorandom code sequence. This pseudorandom code sequence is modulated onto an information signal provided by an information source 10. The information signal comprises a plurality of data symbols intended for transmission. The modulated signal output from modulator 11 is then optionally processed by a wave shaper 13, to condition the modulated signal prior to being radiated by an antenna 14.

There exist a variety of PN code sequence schemes. Some of the widely used PN sequences are the maximum length shift register sequence (or m-sequence for short), Gold sequence and the Kasami sequence. In an embodiment of this invention, modulator 11 uses an M-ary (near) orthogonal modulation (OM) scheme with an alphabet $$X \in \{x_j(t)\}_{j=0}^{M-j},$$

where $$x_j(t) = \sum_{k=0}^{N_s-1} (1 - 2c_j^k) p(t - kT_f)$$

is the j-th symbol, and the parameter $N_s$ is the period of the PN sequence $c=(c_0, c_1, \ldots, c_{N_s-1})$, which is generated from the PN code generator 12, $c_j^k$ is the k-th chip of the j-th cyclic shift of c, $c_j^k \in \{0,1\}$ and $T_f$ is the chip duration. Here the alphabet size M should satisfy $M=2^I<N_s$, where I is an integer.

Modulator 11 also includes a pulse generator, which generates an analog waveform p(t) having a pulse duration $T_p$. To ensure that there is neither inter-chip nor inter-symbol interference, the chip duration $T_f$ satisfies the condition $T_p+T_d<T_f$, where $T_d$ is the delay spread of the channel.

Figure 2A:
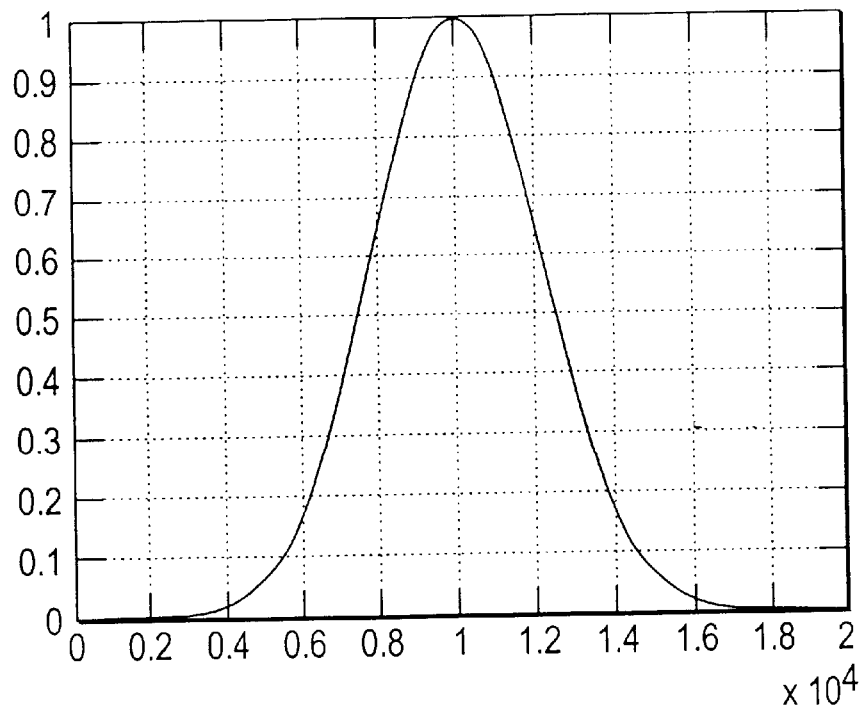
FIG. 2A shows a digital '0' as represented by a positive Gaussian monocycle waveform.

In the following discussion, a digital '0' is represented by a Gaussian monocycle waveform as shown in FIG. 2A. A Gaussian monocycle signal can be described mathematically as $$p(t) = V_0 e^{(-\frac{t}{\tau})^2},$$

where $V_0$ is the peak amplitude, $\tau$ is a time constant.

Figure 2B:
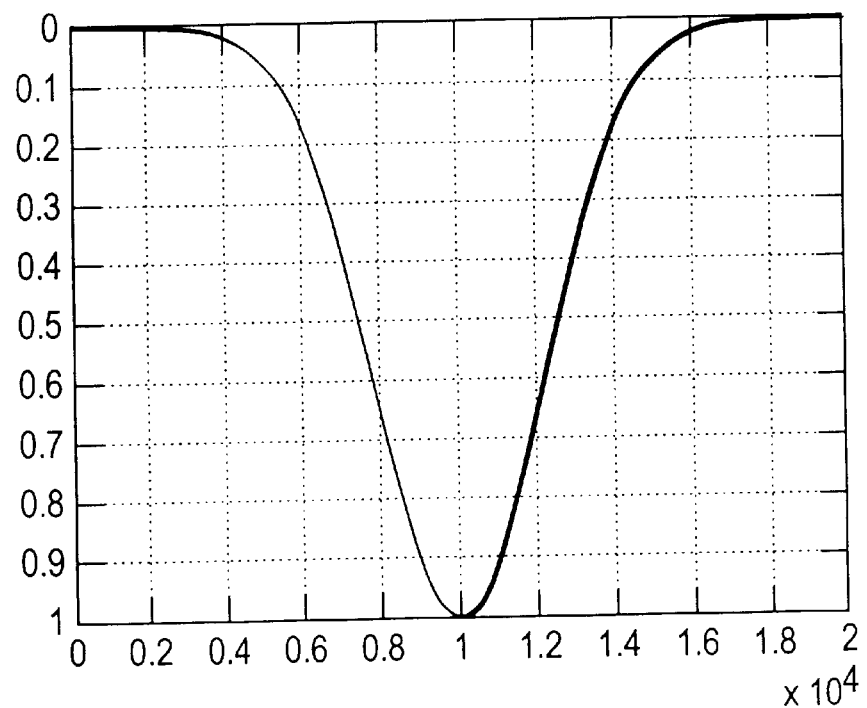
FIG. 2B shows a digital '1' as represented by a negative Gaussian monocycle waveform.

A digital '1' is represented by sending a negative Gaussian monocycle waveform as shown in FIG. 2B. It should be noted that other types of antipodal waveforms, e.g., second derivative Gaussian pulse can also be used.

The modulation scheme discussed here actually employs antipodal signaling at the chip level. This, together with the properties of PN sequences, lead to a correlation between any two symbols in the set X to approximately zero when the period of the PN sequence, $N_s$, is large. Thus, this signaling scheme is termed as an orthogonal modulation.

FIG. 1B shows a block diagram of the receiver 7, according to an embodiment of the present invention. The received UWB RF signal 120 may first pass through an optional wave shaping circuit 100 such as a filter, an integrator or envelop detector to help optimize detection.

Figure 3:
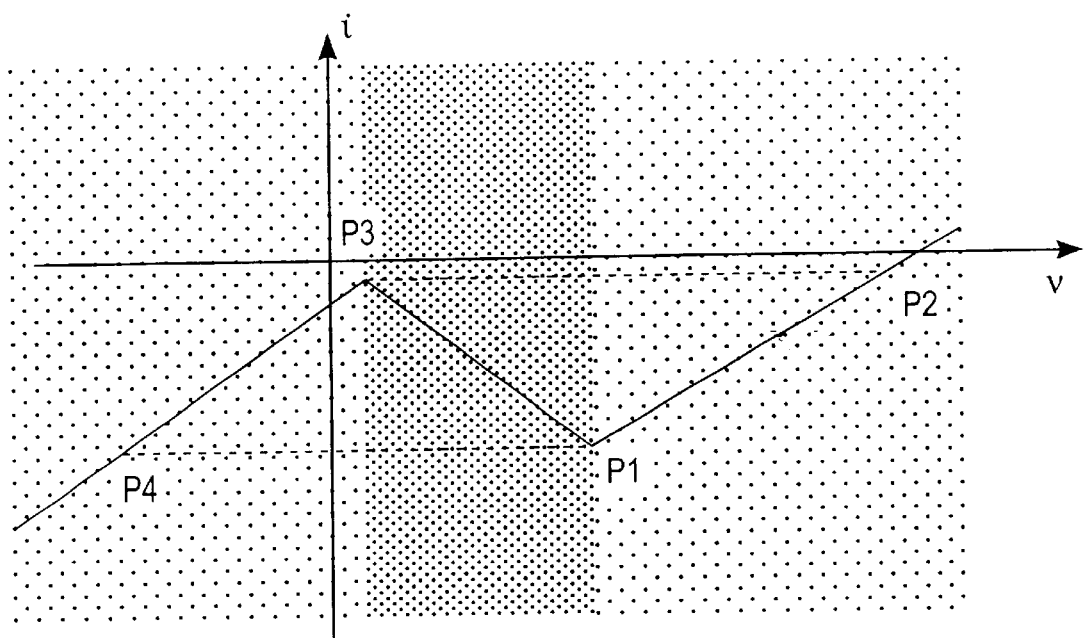
FIG. 3 shows i–v transfer characteristics of a nonlinear circuit element d in a detection circuit in a receiver, according to an aspect of the present invention.

Signal 101, which represents the conditioned received UWB RF signal, is coupled to parallel circuits 109 and 110. Circuit 109 comprises an inductor 103 and a circuit 104, which is coupled in series with inductor 103. Circuit 104, has N-type i–v transfer characteristics, as shown in FIG. 3. This characteristic curve can be dynamically manipulated by the input 107. The output from the circuit 109 consists of a series of pulses or silences depending on the received signals. Circuit 109 may be referred to as a "positive" detector, as it only generates pulses when the received signal is above a certain positive threshold level.

Similarly, circuit 110 comprises an inductor 105 and another circuit 106, which is coupled in series with inductor 105. Like circuit 104, circuit 106 has N-type i–v transfer characteristics. In an embodiment of the invention, circuits 104 and 106 are nonlinear circuits. Regarding the transfer characteristics of circuits 104 and 106, the transfer curve for circuit 106 is positioned at a different location by applying a predetermined and controlled voltage at input 108. Input 108 may also be used to dynamically manipulate the transfer curve by providing a variable voltage to input 108. Similar to the output of circuit 109, the output signal from circuit 110 comprises a series of pulses or silences, depending on the received signals. Because the transfer curves of circuits 109 and 110 are different, they respond differently to the same input signal. Circuit 110 may be referred to as a "negative" detector, as it responds by generating pulses only if the input signal is lower than a certain negative threshold.

The output signals from circuits 109 and 110 are coupled to pulse processing circuit 112, which determines the appropriate decoded digital signal 113. Pulse processing circuit can be implemented based on logic circuits using gate array boards, digital signal processing boards, or the like. Further details pertaining to the operation of the signal processing circuit are provided below.

Referring again to the characteristic curve of circuit 104 shown in FIG. 3, it is seen that the transfer curve includes two impasse points P1=($V_v$, $i_v$) and P3=($V_p$, $i_p$). Here, $i_v$ and $i_p$ represent the valley and the peak current of the N curve. Although shown as such, it is not necessary that the curves be piecewise linear. The only requirement is that the characteristic curve be comprised of three distinct regions: a middle region having a negative impedance slope bounded by two other regions having positive impedance slopes. Under the condition that the input signal is operating at the line segment P1–P3 of the characteristic curve, pulses will be generated which travel along the state trajectory P4→P3→P2→P1→P4. The number of pulses generated depends on the available time (i.e. the duration that the input signal is operating on the line segment P1–P3) and the speed of the trajectory. The basic operation of the circuit 106 is similar to what we have discussed for the circuit 104 except that the impasse points are located in different locations.

Figure 4:
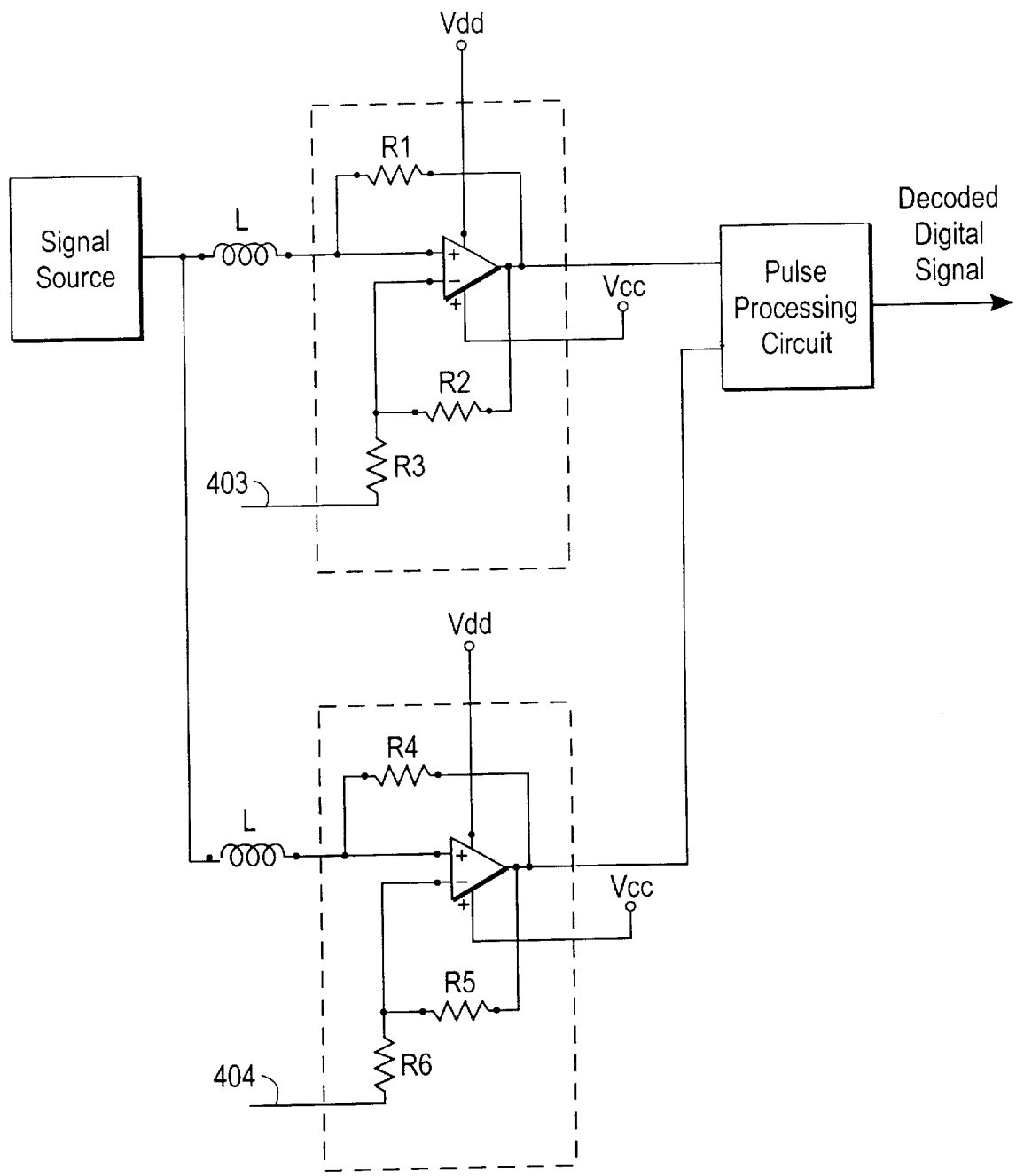
FIG. 4 shows a UWB receiver circuit having op-amp based circuits that provide i–v transfer characteristics similar to the i–v transfer characteristics shown in FIG. 3.

Referring now to FIG. 4, there is shown how circuit 104 of positive detector 109 and circuit 106 of negative detector 110 shown in FIG. 1B may be implemented using op-amp based circuits, according to an embodiment of the present invention. These op-amp based circuits have piecewise linear i–v characteristics similar to the characteristics shown in FIG. 3. In this illustrative embodiment, the slopes of the characteristic curves and the impasse points can be adjusted easily by changing the values of R1, R2, R3, R4, R5, R6 and the biasing voltages Vcc and Vdd. Control inputs 107 and 108 in FIG. 1 are shown and labeled as 403 and 404, respectively, in FIG. 4. In a particular embodiment, two different fixed bias voltages may simply be applied, such that the transfer curves are translated to two different predetermined locations. In an operating environment that requires a more sophisticated embodiment of the invention, an operating noise level may be detected to determine a suitable voltage to control inputs 403 and 404. In such an embodiment, the N-type characteristic curves are dynamically translated to different locations and in real time.

Figure 5:
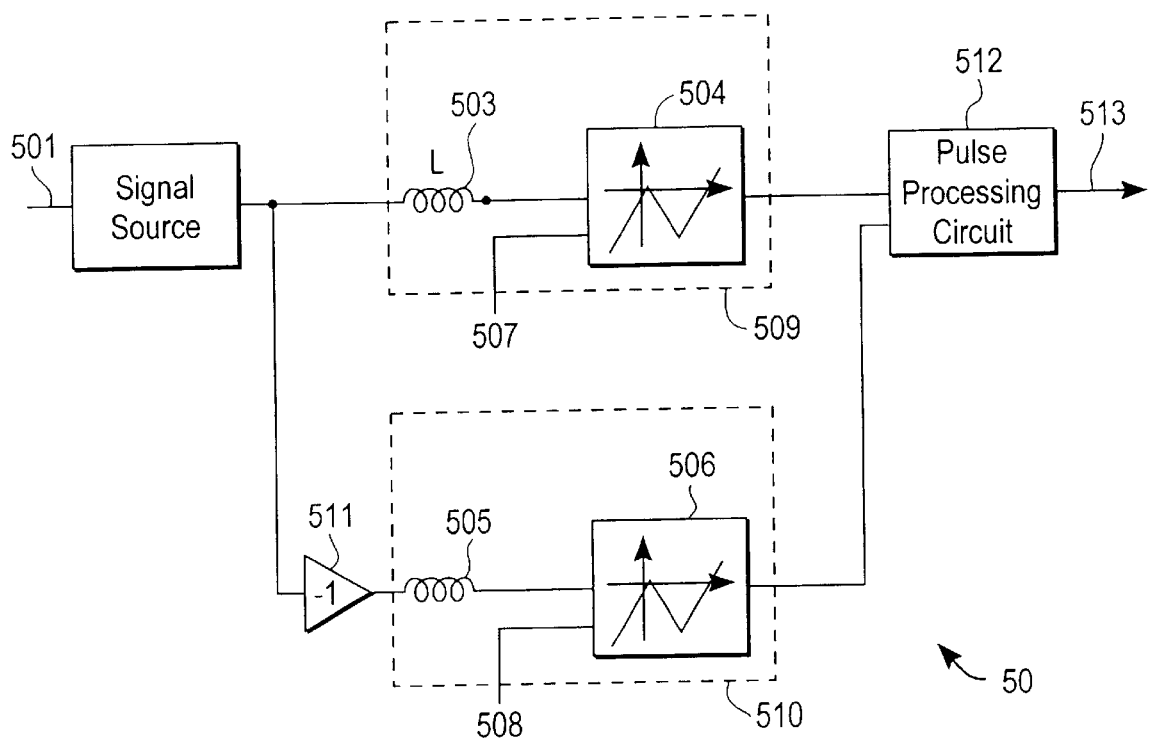
FIG. 5 shows a receiver circuit for a UWB communication system, according to an alternative embodiment of the present invention.

FIG. 5 shows an alternative duo detector UWB receiver 50, according to another illustrative embodiment of the present invention. In this UWB receiver system 50, an input signal from signal source 501 is sent directly to circuit 509, as in the receiver 7 shown in FIG. 1B with 109. However, the input signal is inverted by an inverting circuit 511 before being sent to circuit 510. Circuit 510 has i–v transfer characteristics similar to that of circuit 509. Because the two detectors 509 and 510 receive the signals with opposite polarities, each responds differently and generates different sets of pulses.

The response of the UWB receiver shown in FIG. 5 with the spread spectrum orthogonal modulation scheme described above will now be described. For ease of explanation, the description assumes an M=2-ary modulation scheme, as multi-level modulation is just a simple extension. Also, in this illustrative example, a seven chip m-sequence with c={1 1 1 0 1 0 0} is used. Hence, the symbol '1' is represented as 1110100 and the symbol '2' is 1101001, such that the symbol '2' is a one bit shifted version of the symbol '1'.

Figure 6:
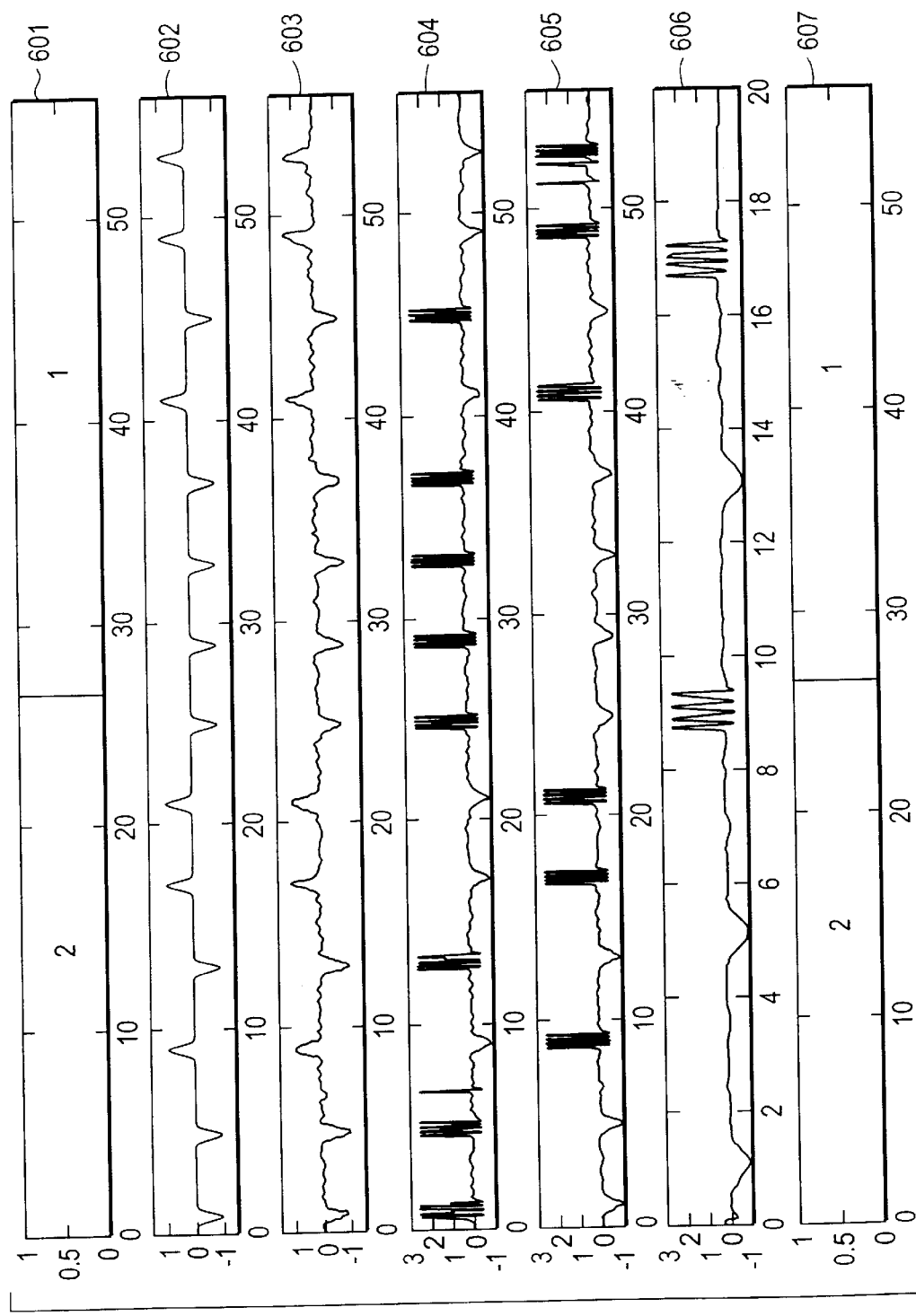
FIG. 6 illustrates a response of the receiver shown in FIG. 5, based on a numerical simulation.

FIG. 6 illustrates a typical response of the receiver shown in FIG. 5, based on a numerical simulation. Waveform 601 represents the symbol to be transmitted. In this illustrative example, the signal being transmitted is the symbol 2 followed by the symbol 1. With the DSSS approach and the PN sequence just mentioned, the modulated signal is shown as waveform 602. Due to the additive white Gaussian noise presence in the channel, the received signal is somewhat corrupted and is shown as waveform 603. The outputs from the two circuits 509 and 510 comprise a series of pulses depending on the location of the signals as well as the level of the noises. These outputs are shown as waveforms 604 and 605 for the negative and positive detectors in FIG. 5, respectively. Depending on the tuning of the circuits, the presence of the digital signal can be set to generate a specified number of pulses. In this illustrative example, four pulses are used. The waveform 606 shows a detail view of the waveform 605. Upon receiving these pulses, the pulse processing system will determine the decoded digital signals.

The output signals from circuits 509 and 510 are coupled to a pulse processing circuit 512, which determines the appropriate decoded digital signal 113. Pulse processing circuit 512 can be implemented using logic circuits using gate array boards, digital signal processing boards, or the like.

Pulse processing circuit 512 performs the following tasks. First, prior to transmission, it stores a priori the ideal pulse-generating instants when the received symbols $x_i(t)$ are fed to the positive and negative detectors in M×N arrays A and B, where $N_t$ is the number of pulses generated per symbol. The (i, j)-th element of A and B, denoted by a(i,j) and b(ij) are the j-th pulse-generating instant. Second, pulse processing circuit 512 initializes the decision metrics $W=(w_0, w1, \ldots, w_{M-1})$ for the positive detector 509 and: the decision metrics $U=(u_0, u_1, \ldots, u_{M-1})$ for the negative detector 510 to zero. Third, pulse processing circuit 512 stores the actual pulse-generating instants from the detectors in array $Y=(y_1, y_2, \ldots, y_N)$ for positive detector 509 and array $Z=(z_1, z_2, \ldots z_N)$ for negative detector 510. Fourth, for each combination of $0 \leq i \leq M-1$, $1 \leq j \leq N_t$ and $1 \leq k \leq N$ pulse processing circuit 512 checks if the condition a(i, j)$-\Delta \leq y_k \leq$a(i, j)$+\Delta$ is satisfied for positive detector 509. If it is, the metric $w_i$ is incremented by one. The parameter $\Delta$ is the width of the detection window and it is a design parameter. Similarly, pulse processing circuit 512 checks if the following condition b(i, j)$-\Delta \leq z_k \leq$b(i, j)$+\Delta$ is satisfied for negative detector 510. If it is, the metric $u_i$ is incremented by one for negative detector 510. Fifth, pulse processing circuit 512 combines the metrics of positive detector 509 and negative detector 510 according to $\delta_i = u_i + w_i$, $i=0,1, \ldots, M-1$. Finally, pulse processing circuit 512 decides that $x_m(t)$ is the most likely transmitted symbol, if $\delta_m$ is the largest amongst all the $\delta_i$, $0 \leq i \leq M-1$. In this example, the decoded symbol is shown as signal 607, which is the same as the symbol sent.

Figure 7:
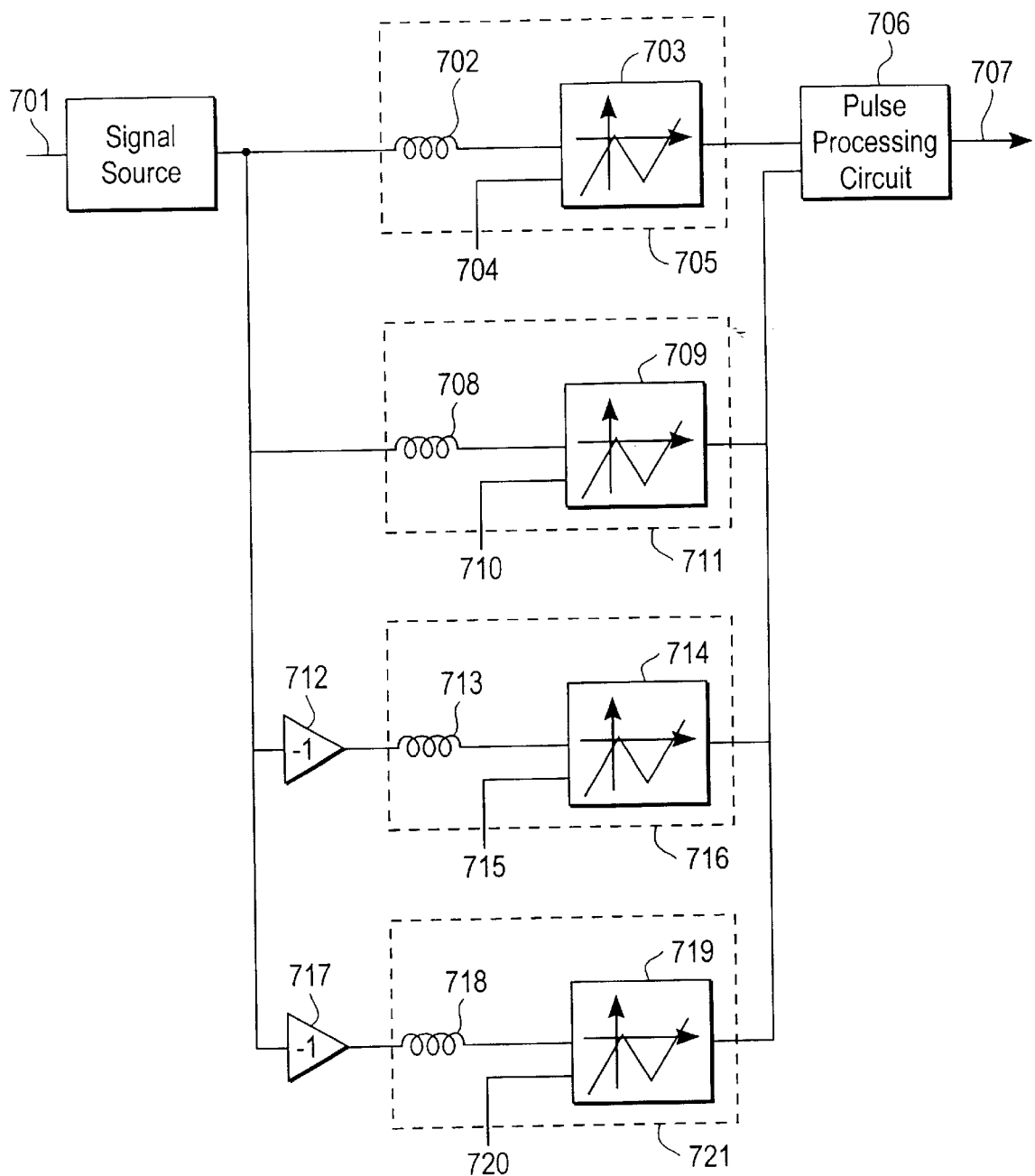
FIG. 7 illustrates a receiver circuit having four detectors for a UWB communication system, according to an embodiment of the present invention.

While the above is a complete description of numerous embodiments of the invention, various alternatives, modifications, and equivalents may be used. For example, multiple detector configurations are possible and within the scope of the inventions described in this application. FIG. 7 shows, for example, a four detector system having four N-type circuits coupled in parallel. The i–v transfer characteristics for each N-type circuit may be constructed such that it has a different set of impasse points, so that it responds to input signals differently than another of the other N-type circuits, which is characterized by its own set of impasse points. FIG. 7 shows a specific example of a four detector system. However, it is to be understood that other embodiments having more or less detectors is possible according to the inventions described herein. For these and other reasons, therefore, the above description should not be taken as limiting the scope of the invention, which is defined by the appended claims.

What is claimed is:

1. A receiver circuit for receiving an ultra wide-band (UWB) signal, comprising:
    an antenna operable to receive the UWB signal;
    a first circuit having a first pulse generator operable to produce a first pulse sequence in response to the UWB signal;
    a second circuit coupled in parallel with the first circuit, said second circuit having a second pulse generator operable to produce a second pulse sequence in response to the UWB signal; and
    a pulse processing circuit operable to decode the first and second code sequences and determine information carried in the UWB signal.

2. The receiver circuit of claim 1 wherein said first and second circuits are nonlinear circuits.

3. The receiver circuit of claim 1 wherein said first and second pulse generators each have an associated transfer curve characterized by an unstable region bounded by stable regions.

4. The receiver circuit of claim 1 wherein said UWB signal comprises a pseudorandom code sequence modulated onto an information signal.

5. The receiver circuit of claim 4 wherein the pseudorandom code sequence is modulated using an M-ary orthogonal modulation scheme.

6. The receiver circuit of claim 4 wherein the pseudorandom code sequence is modulated using an antipodal modulation scheme.

7. The receiver circuit of claim 6 wherein the antipodal modulation scheme provides positive and negative Gaussian monocycle waveforms representing a digital "0" and digital "1", respectively.

8. The receiver circuit of claim 1 wherein the first pulse generator generates the first pulse sequence, only if the received UWB signal has a voltage level that is higher than a predetermined positive threshold value.

9. The receiver circuit of claim 8 wherein the second pulse generator generates the second pulse sequence, only if the received UWB signal has a voltage level that is lower than a predetermined negative threshold value.

10. An ultra wide-band (UWB) communication system, comprising:
    one or more transmitters operable to transmit one or more UWB signals; and
    a receiver operable to receive the UWB signals, said receiver comprising;

a first circuit having a first pulse generator operable to produce a first pulse sequence in response to the UWB signals;

a second circuit coupled in parallel with the first circuit, said second circuit having a second pulse generator operable to produce a second pulse sequence in response to the UWB signals; and a pulse processing circuit operable to decode the first and second code sequences and determine information carried in the UWB signals.

11. The UWB communication system of claim 10 wherein the first and second circuits are nonlinear circuits.

12. The UWB communication system of claim 10 wherein the first and second pulse generators of the receiver each have an associated transfer curve characterized by an unstable region bounded by stable regions.

13. The UVB comununication system of claim 10 wherein the one or more transmitters each have a modulator for modulating a pseudonoise code sequence onto information signals.

14. The UWB communication system of claim 13 wherein each of the modulators uses an M-ary orthogonal modulation scheme.

15. The UWB communication system of claim 10 wherein the first pulse generator generates a pulse sequence, only when a received UWB signal has a voltage level that is higher than a predetermined positive threshold value.

16. The UWB communication system of claim 10 wherein the second pulse generator generates a pulse sequence, only when a received UWB signal has a voltage level that is lower than a predetermined negative threshold value.

17. The UWB communication system of claim 13 wherein the modulators use an antipodal modulation scheme.

18. The UWB communication system of claim 17 wherein the antipodal modulation scheme provides positive and negative Gaussian monocycle waveforms representing a digital "0" and digital "1", respectively.

19. An ultra wide-band (UWB) communication system, comprising:

a plurality of transmitters operable to transmit a corresponding plurality of UWB signals;

a plurality of detectors, each detector having a pulse generating circuit for generating a unique pulse sequence in response to the UWB signals; and a pulse processing circuit operable to decode the pulse sequences and determine information carried in the UWB signals.

20. The UWB communication system of claim 19 wherein each pulse generating circuit is a nonlinear circuit.

21. The UWB communication system of claim 19 wherein the plurality of detectors are capable of generating the pulse sequences upon receipt of a simultaneous transmission of the plurality of UWB signals.

22. The UWB communication system of claim 19 wherein the plurality of transmitters are configured to transmit simaultaneously over the same channel.

23. The UWB communication system of claim 22 wherein spread spectrum techniques are used to create the UWB signals.

24. The UWB communication system of claim 23 wherein the spread spectrum technique used is the direct sequence spread spectrum technique.

25. The UWB communication system of claim 24 wherein each of the transmitters each has a modulator for modulating a pseudonoise (PN) code sequence to create the UWB signals.

26. The UWB communication system of claim 25 wherein each of the modulators uses an M-ary orthogonal modulation scheme.

27. The UWB communication system of claim 25 wherein the modulators use an antipodal modulation scheme.

28. The UWB communication system of claim 27 wherein the antipodal modulation scheme provides positive and negative Gaussian monocycle waveforms representing a digital "0" and digital "1", respectively.

29. A receiver circuit for receiving an ultra wide-band (UWB) signal, comprising:

an antenna operable to receive the UWB signal;

a first circuit having a first pulse generator operable to produce a first pulse sequence in response to the WB signal;

an inverter configured to receive the UWB signal and provide an inverted UWB signal;

a second circuit coupled in parallel with the first circuit, said second circuit having a second pulse generator operable to produce a second pulse sequence in response to the inverted UWB signal; and a pulse processing circuit operable to decode the first and second code sequences and determine information carried in the UWB and inverted UWB signals.

30. The receiver circuit of claim 29 wherein said first and second circuits are nonlinear circuits.

31. The receiver circuit of claim 29 wherein said first and second pulse generators each have an associated transfer curve characterized by an unstable region bounded by stable regions.

32. The receiver circuit of claim 29 wherein said UWB signal comprises a pseudorandom code sequence modulated onto an information signal.

33. The receiver circuit of claim 32 wherein the pseudorandom code sequence is modulated using an M-ary orthogonal modulation scheme.

34. The receiver circuit of claim 32 wherein the pseudorandom code sequence is modulated using an antipodal modulation scheme.

35. The receiver circuit of claim 34 wherein the antipodal modulation scheme provides positive and negative Gaussian monocycle waveforms representing a digital "0" and digital "1", respectively.

36. A method of producing information contained in an ultra wide-band (UWB) signal comprising:

receiving the UWB signal;

producing a first pulse sequence from the UWB signal;

producing a second pulse sequence from the UWB signal; and producing information based on the first and second pulse sequences.

37. The method of claim 36 wherein the step of producing the first pulse sequence includes applying the UWB signal to a first nonlinear circuit and the step of producing the second pulse sequence includes applying the UWB signal to a second nonlinear circuit.

38. The method of claim 37 wherein the UWB signal is applied to the first and second circuits at substantially the same time.

39. The method of claim 36 wherein spread spectrum techniques are used to create the UWB signal.

40. The method of claim 39 wherein the spread spectrum technique used is the direct sequence spread spectrum technique.

41. The method of claim 36 wherein the UWB signal is created with a modulated pseudonoise code sequence.

42. The method of claim 41 wherein the modulated pseudonoise uses an M-ary orthogonal modulation scheme.

43. The method of claim 42 wherein the modulated pseudonoise uses an antipodal modulation scheme.

* * * * *